United States Patent
Park

(10) Patent No.: US 8,230,514 B2
(45) Date of Patent: Jul. 24, 2012

(54) METHOD FOR PREVENTING KEY LOGGER FROM HACKING DATA TYPED ON KEYBOARD THROUGH AUTHORIZATION OF KEYBOARD DATA

(75) Inventor: Hee An Park, Seoul (KR)

(73) Assignee: AHN Lab, Inc. (KR)

( * ) Notice: Subject to any disclaimer, the term of this patent is extended or adjusted under 35 U.S.C. 154(b) by 1195 days.

(21) Appl. No.: 11/913,898

(22) PCT Filed: Sep. 29, 2006

(86) PCT No.: PCT/KR2006/003921
§ 371 (c)(1),
(2), (4) Date: Nov. 16, 2007

(87) PCT Pub. No.: WO2007/043761
PCT Pub. Date: Apr. 19, 2007

(65) Prior Publication Data
US 2008/0189790 A1   Aug. 7, 2008

(30) Foreign Application Priority Data
Oct. 12, 2005 (KR) .................. 10-2005-0096023

(51) Int. Cl.
*G06F 11/00* (2006.01)
(52) U.S. Cl. ............. 726/26; 726/22; 726/23; 726/24; 726/25
(58) Field of Classification Search ......... 713/187–196, 713/151, 160–161, 164–165; 726/21–25, 726/26–30
See application file for complete search history.

(56) References Cited

U.S. PATENT DOCUMENTS

| | | | |
|---|---|---|---|
| 6,138,239 A * | 10/2000 | Veil | 726/10 |
| 7,774,595 B2 * | 8/2010 | Chung Geon et al. | 713/154 |
| 7,779,062 B2 * | 8/2010 | Waterson | 709/200 |
| 7,823,201 B1 * | 10/2010 | Xu | 726/22 |
| 2002/0157021 A1 * | 10/2002 | Sorkin et al. | 713/201 |
| 2002/0162017 A1 * | 10/2002 | Sorkin et al. | 713/201 |
| 2003/0159053 A1 * | 8/2003 | Fauble et al. | 713/189 |
| 2004/0006709 A1 * | 1/2004 | Chen | 713/201 |
| 2004/0034794 A1 * | 2/2004 | Mayer et al. | 713/200 |
| 2004/0123160 A1 * | 6/2004 | Mizrah | 713/202 |
| 2005/0262555 A1 * | 11/2005 | Waterland | 726/21 |
| 2006/0036731 A1 * | 2/2006 | Mossman et al. | 709/225 |
| 2006/0101128 A1 * | 5/2006 | Waterson | 709/212 |
| 2006/0168455 A1 * | 7/2006 | Kelley et al. | 713/183 |
| 2006/0253577 A1 * | 11/2006 | Castaldelli et al. | 709/225 |
| 2007/0180263 A1 * | 8/2007 | Delgrosso et al. | 713/186 |

(Continued)

*Primary Examiner* — Eleni Shiferaw
*Assistant Examiner* — Phy Anh Vu
(74) *Attorney, Agent, or Firm* — Baker & Hostetler LLP

(57) ABSTRACT

A method for preventing a key logger from hacking the keyboard data typed on keyboard through authorization of keyboard data according to the present invention involves transmitting a seed and hash counter, which were created according to a ready-to-input signal in an application program to be protected from hacking, to a device driver; creating a first key data on the basis of the seed and hash counter or a keyboard data created by a keyboard interrupt created from outside in the device driver; creating a second key data on the basis of the seed and hash counter when the application program receives the first key data or a keyboard event data equivalent to the keyboard data; comparing the keyboard event data with the second key data; and receiving the keyboard event data as the data typed on keyboard when the keyboard event data is not identical with the second key data according to the result of the comparison of the prior step.

11 Claims, 3 Drawing Sheets

U.S. PATENT DOCUMENTS

| | | | |
|---|---|---|---|
| 2007/0180520 A1* | 8/2007 | Horne | 726/22 |
| 2008/0240447 A1* | 10/2008 | Zhu et al. | 380/279 |
| 2009/0187763 A1* | 7/2009 | Freericks et al. | 713/167 |
| 2009/0187991 A1* | 7/2009 | Freericks et al. | 726/24 |
| 2009/0254994 A1* | 10/2009 | Waterson | 726/26 |
| 2010/0185876 A1* | 7/2010 | Kim | 713/190 |

* cited by examiner

[Fig. 1]
(PRIOR ART)
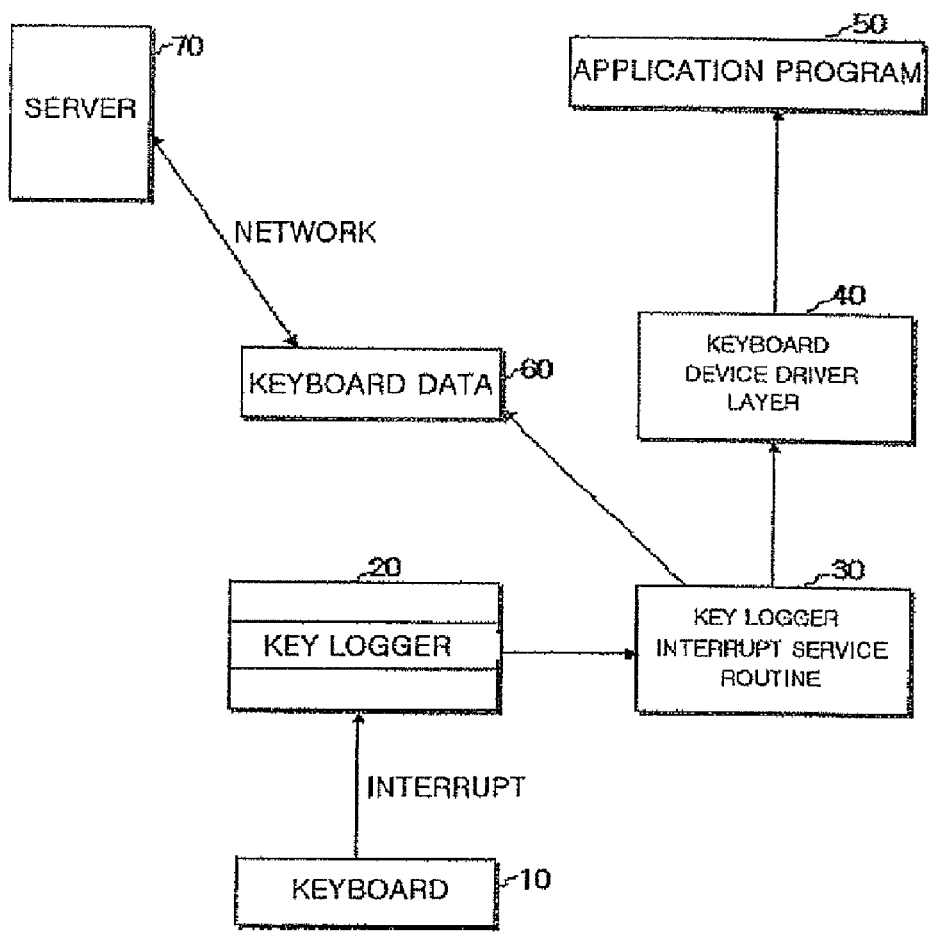

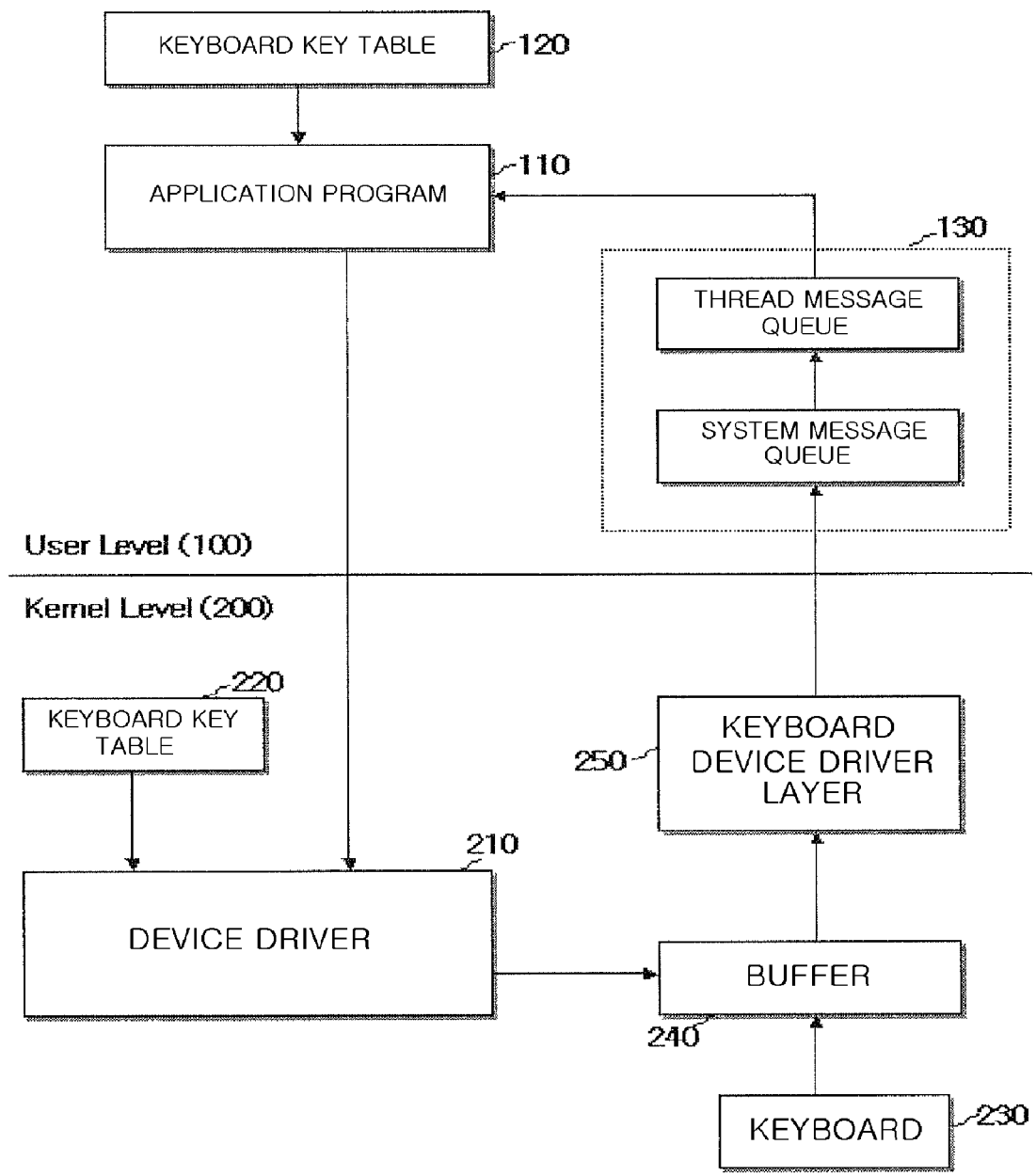

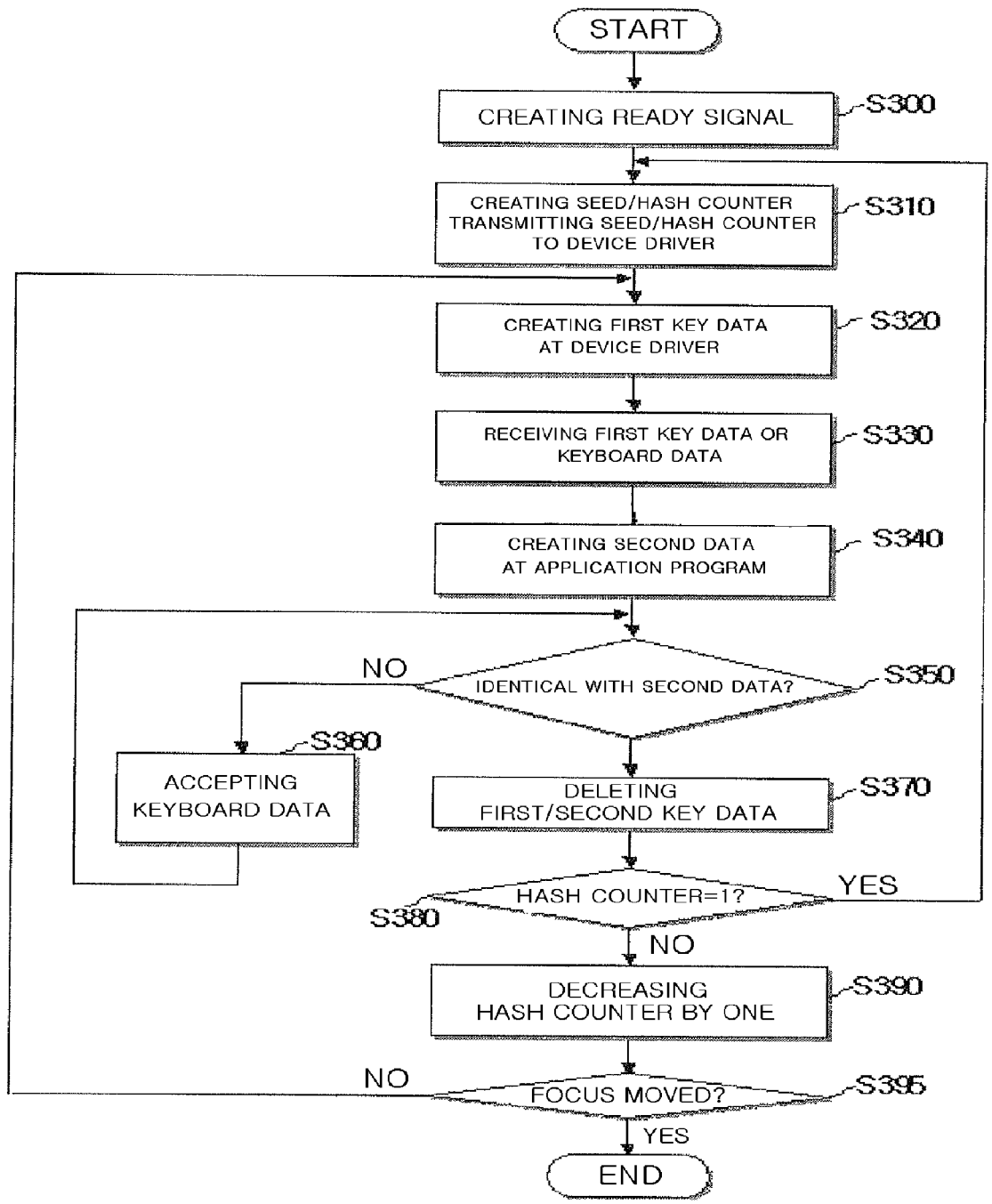

METHOD FOR PREVENTING KEY LOGGER FROM HACKING DATA TYPED ON KEYBOARD THROUGH AUTHORIZATION OF KEYBOARD DATA

TECHNICAL FIELD

The present invention relates to a method for preventing a key logger from hacking the data or information typed on keyboard. More particularly, the present invention relates to the method for preventing a key logger from hacking the data or information typed on keyboard through authorization of the keyboard data wherein the data typed on keyboard includes a piece of authorization information and thereby one of the data is recognized as authentic only if a certain condition is met.

BACKGROUND ART

The key logger is a program which is generally installed in a computer system of users and which draws out one of the data typed on keyboard by users. The key logger works in the same manner as the Trojan horse does in that a piece of the stolen information about users is transmitted to another computer system wherein a corresponding key logger is installed. The piece of information stolen in this way is used for various crimes, for example withdrawing someone else's money through internet banking and selling others the user IDs and passwords used in online games.

Anti key logger is a program for stopping key logger's activities. The anti key logger protects the information typed on keyboard by users by intercepting from the beginning a key logger which takes away the information typed on keyboard. The anti key logger in this kind uses various methods, for example (1) a method of inputting data through not a conventional keyboard but a mouse with a false image of keyboard on screen, (2) a method comprising the following steps of creating a device driver related with keyboard, encrypting keyboard data coming from a hardware, and letting the device driver communicate with applied programs directly, and (3) a physical method of producing a keyboard with a built-in security system.

The second method is the most widely used one among those methods. According to the method, the device driver created and thereafter inserted into the device driver layer, stops a key logger from taking away the data typed on keyboard by letting not another device driver at an upper layer but an application program control when a device driver is given a control. On the other hand, a device driver may be located at lower layer than the pre-installed device drivers; if anti key logger is located at lower layer than key logger device driver, the anti key logger cannot carry out the task for protecting the data typed on keyboard.

Accordingly, the method of having data in control for protection at anti key logger's ISR (Interrupt Description Table) is most widely used through a method of hooking IDT (Interrupt Description Table) which eventually locates an anti key logger lower than a key logger. Nevertheless, the method has a problems in that a hook chain may form in a similar way to a case in which hooking technology is applied and that a computer system does not function normally when the chain is broken.

FIG. 1 illustrates a case when an anti key logger is located lower than a key logger. If an interrupt by keyboard 10 is created when the key logger is located lower than the anti key logger; a control is taken at a key logger ISR (Interrupt Service Routine) 30 installed by not the original ISR but a key logger 20, and thereafter the key logger 20 sends a hooked keyboard data 60 to a server 70.

Accordingly, the conventional method has a fatal limitation in that no protection is accomplished in anti key logger due to the fact that key logger 20 is controlled earlier than anti key logger located at keyboard device driver layer 40.

The present inventors in efforts to overcome the conventional shortcomings in their research have developed a method for preventing a key logger from hacking the data typed on keyboard through authorization of keyboard data, which may provide answers to the above-mentioned problems with not the method of stopping a key logger from intercepting keys but a method of letting a key logger take the meaningless keys away.

DISCLOSURE OF INVENTION

Technical Problem

An object of the present invention is to provide a method for preventing a key logger from hacking the data or information typed on keyboard through authorization of keyboard data wherein the data typed on keyboard includes a piece of authorization information and thereby the data is recognized as authentic only if a certain condition is met.

Another object of the present invention is to provide the method for preventing a key logger from intercepting the data typed on keyboard through authorization of keyboard data, and thereby provides answers to the conventional problems with not the method of stopping a key logger from intercepting keys but a method of letting a key logger take meaningless keys away.

A further objective of the present invention is to provide the method for preventing a key logger from hacking the data typed on keyboard through authorization of keyboard data, which prevents a key logger from drawing out the authentic keyboard data although the key logger may hack keyboard data.

Still a further objective of the present invention is to provide the method for preventing a key logger from hacking the data typed on keyboard through authorization of keyboard data, and thereby the authentic data cannot be drawn out only with collected key board data although the behind-mechanism of the method is exposed to a user with ill will, unless random seed and hash counter actually used in one time password encrypted in an algorithm form is found.

Still a further objective of the present invention is to provide the method for preventing a key logger from hacking the data typed on keyboard through authorization of keyboard data, which prevents hacking data through search of a memory by storing a seed and hash counter in a memory in the form of an intermediate seed and converting the foregoing to final seed during the time of use and again converting the final seed back to the intermediate seed form when they are not used.

Technical Solution

A method for preventing a key logger from hacking the keyboard data typed on keyboard through authorization of keyboard data according to the present invention comprises the steps of:

transmitting a seed and hash counter, which were created according to a ready-to-input signal in an application program to be protected from hacking, to a device driver;

creating a first key data on the basis of the seed and hash counter or a keyboard data created by a keyboard interrupt created from outside in the device driver;

creating a second key data on the basis of the seed and hash counter when the application program receives or a keyboard event data which corresponds to either the first key data or the keyboard data;

comparing the keyboard event data with the second key data; and receiving the keyboard event data as the data typed on keyboard when the keyboard event data is not identical with the second key data according to the result of the comparison of the prior step.

The application program transmits the seed and hash counter to the device driver through an encrypted session.

The application program and the device driver store the seed and hash counter in the form of an intermediate seed in a memory.

Further, the step of creating the first and second key data in the device driver according to the present invention comprises:

creating an one time password on the basis of the seed and hash counter according to an algorithm; and creating the first and second key data by mapping the one time password on one of the data at keyboard mapping table through modular calculation.

The method further comprises:

decreasing the hash counter by one if the hash counter is not 1, when the keyboard event data is identical with the second key data according to the result of the comparison between the keyboard event data and the second key data;

re-creating the first key data and the second key data based on the hash counter decreased by one in the device driver and the application program; and transmitting the keyboard data including the first key data to the application program.

The method further comprises the step of creating a seed and hash counter if the hash counter is 1 in the application program.

On the other hand, the present invention further comprises a recording medium readable by computer, which is recorded with a program for accomplishing the above-mentioned steps.

BRIEF DESCRIPTION OF THE DRAWINGS

FIG. 1 is a block diagram which represents a conventional method for preventing a key logger from hacking the data typed on keyboard.

FIG. 2 is a block diagram which represents a method for preventing a key logger from hacking the data typed on keyboard through authorization of keyboard data.

FIG. 3 is a flow chart which represents the method for preventing a key logger from hacking the data typed on keyboard through authorization of keyboard data.

The preferred embodiments will be described in detail with reference to appended drawings in the following.

BEST MODE FOR CARRYING OUT THE INVENTION

FIG. 2 is a block diagram which represents a method for preventing a key logger from hacking the data typed on keyboard through authorization of keyboard data.

With reference to FIG. 2, computer system comprises a user level 100 and a kernel level 200.

The Kernel level 200 is an area to control directly the physical device such as keyboard 230, or hardware. Device driver 210 in kernel level 200 controls data input from an external device and provides data to user level 100. In other words, if the data typed on keyboard 230 is inputted an interrupt is created, a corresponding data to the data typed by a user is drawn out from buffer 240 and thereafter the corresponding data is transmitted to keyboard device driver layer 250.

Necessary tasks for the data are executed at the each layer constituting keyboard device layer 250 and thereafter the data is converted to the form of a window message to be transmitted to user level 100. One of the data corresponding to the data typed by user is called keyboard data.

Further, device driver 210 in kernel level 200 receives a seed and hash counter from application program 110 in user level 100 to create a first key data.

A piece of data corresponding to the interrupt which is inputted from keyboard 230 or device driver 210 is stored at buffer 240 of kernel level 200. The keyboard data or the first key data is drawn out from the buffer 240 and thereafter transmitted to keyboard device driver layer 250.

User level 100 is an area wherein application program 110 operates for protecting keyboard data which is inputted from keyboard. The application program 110 creates a seed and hash counter to transmit the foregoing to device driver 210 of kernel level 200, and creates a second key data on the basis of the seed and hash counter.

At this moment, one of the keyboard data which is inputted at keyboard 230 or a first key data created from device driver 210 is transmitted in the form of a windows message from kernel level 200 to user level 100. If the foregoing reaches the windows message queue 130 of the edit box window having the focus of a cursor, a message handler of the edit box window compares the keyboard data or a first key data individually with a second key data.

If a keyboard data is transmitted to application program 110 the keyboard data is not identical with the second key data, but if a first key data is transmitted to the application program 110 the first key data is identical with the second key data since both the first key data and second key data are created based on the same seed and hash counter. Accordingly, the application program 110 displays the real letters that a user typed by extracting a message from the window message queue 130 and showing the letters identical with a corresponding message on the edit box only if the second data is compared and turned out not to be identical either with the keyboard data or the keyboard event data, that is, one of the first key data in an occasion when a keyboard data or first key data is transmitted to application program.

The implementation process of the method for preventing a key logger from hacking the data typed on keyboard through authorization of keyboard data according to the present invention will be illustrated with reference to FIG. 3 hereinafter. FIG. 3 is a flow chart which represents the method for preventing a key logger from hacking the data typed on keyboard through authorization of keyboard data.

According to FIG. 3, like any other application programs which is embodied on the internet, during operation of application program 110 which is to be protected from hacking and which works in computer system, if the focus of a cursor is located on the edit box in which one of the data relating to personal information of user is inputted, a ready-to-input signal is created and thereafter the ready-to-input signal is transmitted to the application program 110. The ready-to-input signal is the sign which notifies that one of the key data will be inputted (S330).

If the ready-to-input signal is transmitted, the application program 110 creates a seed and hash counter and shares the seed and hash counter with the device driver 210 in kernel level 200 via encrypted communication. The seed and hash counter are randomly created values, and the seed and hash counter are used in an algorithm for creating an OTP which stands for One Time Password. An encrypted session is formed between the application program 110 and the device driver 210; the seed and hash counter are transmitted through the encrypted session.

The application program 110 transmits a request message to the device driver 210 to create a keyboard data on the basis of the seed and hash counter. The device driver 210 in response to the request message utilizes the seed and hash counter to create an one time password according to an algorithm. At this moment, the device driver 210 and the application program 110 stores the seed and hash counter in the form of an intermediate key for the protection purpose, and the device driver and application program convert necessarily the seed and hash counter to the form of a final key for use.

The one time passwords created individually at the device driver 210 are mapped through modular calculation to one of the data of the keyboard mapping table 220 shared together with the application program 110 and the device driver 210, and thereafter a mapped first key data is created (S320).

The above-created first key data creates the same interrupt as the one which is created from keyboard 230. One of the data is transmitted to the application program 110 in user level 100 through device driver layer 250 related with the data drawn out from the buffer 240 in a chip for the purpose of processing the interrupt (S330). At this time, the data which is created by the request from the application program 110 is called a first key data, and the authentic data typed on keyboard 230 is called a keyboard data. The data in the form of a message created through the two kinds of data is called a keyboard event data.

More particularly, keyboard device driver at device driver layer 250 carries out necessary tasks on the first key data and keyboard data, and thereafter the very upper device driver takes up a next control. Thereafter, both the first key data and keyboard data pass all the layers of device driver in order; the foregoing data when passing the last layer is converted to one of the keyboard event data in the form of a window message of user level. The keyboard event data in the form of a window message is transmitted to window message queue 130 at the edit box with the focus of a cursor on.

If the application program 110 receives the keyboard event data in the form of a message created by the first key data or keyboard data, the application program creates a second key data by utilizing the seed and hash counter shared with the device driver 210 to create an one time password according to an algorithm and by converting the keyboard event data in the form of a message to the data on the keyboard mapping table 220 through modular calculation (S340).

If the first key data or the keyboard event data created by the keyboard data is compared with the second key data and found out to be identical each other, the first key data and second key data are deleted since the foregoing are the keyboard data created by a request by the application program (S350, S370). In other words, if one of the corresponding data in comparison with the second key data is first key data, the data is identical with one of the second key data, and if one of the corresponding data is one of the keyboard data, the data is not identical with the second key data.

Thereafter, the application program 110 requests the device driver 210 to create one of the keyboard data which is to be mapped on a new one time password. At this time, if a hash counter is not 1, a key that is to be mapped to the new one time password is created by decreasing the hash counter in number by one (S380 and S390). This process is repeated until the hash counter becomes 1, and if the hash counter becomes 1 the application program 110 creates a new seed and hash counter and thereafter transmits the foregoing to a device driver 210.

At the step S350, if the keyboard event data and the second key data are not identical, the keyboard data is accepted since the keyboard event data is not identical with one of the keyboard data created by a request from the application program 110. Thereafter, the step S350 is carried out (S360).

The described flow is completed according to the present invention if the focus of a cursor moves from the application program 110 which is the object of protection, to another application program which is not an object of protection (S395). However, if the focus of a cursor does not move, the step S320 is carried out one more time.

Although a key logger interferes during the described process, the real data typed on keyboard by user cannot be drawn out so long as a log is left in which one of the created keyboard data and the real data typed on keyboard by user are intermingled.

The above-described method for preventing a key logger from hacking the data typed on keyboard through authorization of keyboard data according to the present invention can be programmed and stored in a recording medium readable by computer, for example a CD-ROM, a RAM, a ROM, a floppy disk, a hard disk, an optic disc, and the like.

The present invention can be easily carried out by an ordinary skilled person in the art. Many modifications and changes may be deemed to be with the scope of the present invention as defined in the following claims.

The invention claimed is:

1. A method executed on a computer for preventing a key logger from hacking a keyboard data typed on a keyboard, the method comprising:

transmitting, at an application program to be protected from hacking while being executed on the computer, a seed and a hash counter to a device driver, the seed and the hash counter being created at the application program when a ready-to-input signal is transmitted to the application program;

creating, at the device driver, a first key data or the keyboard data, wherein the first key data is created on the basis of the seed and the hash counter and the keyboard data is created by a keyboard interrupt created in response to an event that the keyboard is typed on;

creating, at the application program, a second key data on the basis of the seed and the hash counter when the application program receives a keyboard event data which corresponds to either the first key data or the keyboard data;

comparing, at the application program, the keyboard event data with the second key data; and receiving, at the application program, the keyboard event data as the keyboard data when the keyboard event data does not correspond to the second key data according to a result of said comparing.

2. The method of claim 1, further comprising:

transmitting, at the application program, the seed and the hash counter to the device driver through an encrypted session.

3. The method of claim 1 or 2, wherein the application program and the device driver store the seed and the hash counter in a form of an intermediate seed in a memory.

4. The method of claim 1, further comprising:
  decreasing the hash counter by one if a value of the hash counter is not 1, when the keyboard event data corresponds to the second key data according to the result of said comparing;
  re-creating the first key data and the second key data based on the hash counter decreased by one; and
  transmitting, at the device driver, the re-created first key data to the application program.

5. The method of claim 1, wherein said creating the first key data includes:
  creating a one time password (OTP) on the basis of the seed and the hash counter according to an algorithm; and
  creating the first key data by mapping the OTP onto one of data which are stored at a keyboard mapping table through modular calculation.

6. The method of claim 1, wherein said creating the second key data includes:
  creating an one time password (OTP) on the basis of the seed and the hash counter according to an algorithm; and
  creating the second key data by mapping the OTP onto one of data which are stored at a keyboard mapping table through modular calculation.

7. A method executed on a computer for preventing a key logger from hacking a keyboard data typed on a keyboard, the method comprising:
  transmitting, at an application program to be protected from hacking while being executed on the computer, a seed and a hash counter to a device driver, the seed and the hash counter being created at the application program when a ready-to-input signal is transmitted to the application program;
  creating, at the device driver, a first key data or the keyboard data, wherein the first key data is created on the basis of the seed and the hash counter and the keyboard data is created by a keyboard interrupt created in response to an event that the keyboard is typed on;
  creating, at the application program, a second key data on the basis of the seed and the hash counter when the application program receives a keyboard event data which corresponds to either the first key data or the keyboard data;
  comparing, at the application program, the keyboard event data with the second key data;
  receiving, at the application program, the keyboard event data as the keyboard data when the keyboard event data does not correspond to the second key data according to a result of said comparing;
  decreasing the hash counter by one if a value of the hash counter is not 1, when the keyboard event data corresponds to the second key data according to the result of said comparing;
  re-creating the first key data and the second key data based on the hash counter decreased by one;
  transmitting, at the device driver, the re-created first key data to the application program;
  re-creating, at the application program, the seed and the hash counter if the value of the hash counter is 1; and
  re-transmitting the re-created seed and the re-created hash counter to the device driver.

8. A non-transitory recording medium readable by a computer, which is recorded with a computer-executable program which causes, when executed, the computer to perform:
  transmitting, at an application program to be protected from hacking while being executed on the computer, a seed and a hash counter to a device driver, the seed and the hash counter being created at the application program when a ready-to-input signal is transmitted to the application program;
  creating, at the device driver, a first key data or the keyboard data, wherein the first key data is created on the basis of the seed and the hash counter and the keyboard data is created by a keyboard interrupt created in response to an event that the keyboard is typed on;
  creating, at the application program, a second key data on the basis of the seed and the hash counter when the application program receives a keyboard event data which corresponds to either the first key data or the keyboard data;
  comparing, at the application program, the keyboard event data with the second key data; and
  receiving, at the application program, the keyboard event data as the keyboard data when the keyboard event data does not correspond to the second key data according to a result of said comparing.

9. The non-transitory recording medium of claim 8, wherein said creating the first key data at the device driver includes:
  creating an one time password (OTP) on the basis of the seed and the hash counter according to an algorithm; and
  creating the first key data by mapping the OTP on one of data at a keyboard mapping table through modular calculation.

10. The non-transitory recording medium of claim 8, wherein said creating the second key data includes:
  creating an one time password (OTP) on the basis of the seed and the hash counter according to an algorithm; and
  creating the second key data by mapping the OTP onto one of data at a keyboard mapping table through modular calculation.

11. A non-transitory recording medium readable by a computer, which is recorded with a computer-executable program which causes, when executed, the computer to perform:
  transmitting, at an application program to be protected from hacking while being executed on the computer, a seed and a hash counter to a device driver, the seed and the hash counter being created at the application program when a ready-to-input signal is transmitted to the application program;
  creating, at the device driver, a first key data or the keyboard data, wherein the first key data is created on the basis of the seed and the hash counter and the keyboard data is created by a keyboard interrupt created in response to an event that the keyboard is typed on;
  creating, at the application program, a second key data on the basis of the seed and the hash counter when the application program receives a keyboard event data which corresponds to either the first key data or the keyboard data;
  comparing, at the application program, the keyboard event data with the second key data;
  receiving, at the application program, the keyboard event data as the keyboard data when the keyboard event data does not correspond to the second key data according to a result of said comparing;

wherein said creating the second key data includes:
creating an one time password (OTP) on the basis of the seed and the hash counter according to an algorithm;
creating the second key data by mapping the OTP onto one of the data at a keyboard mapping table through modular calculation; and
decreasing the hash counter by one if a value of the hash counter is not 1, when the keyboard event data corresponds to the second key data according to a result of said comparing;
re-creating the first key data and the second key data based on the hash counter decreased by one in the device driver and the application program; and
transmitting the keyboard data including the first key data to the application program.

* * * * *